US008791808B2

(12) United States Patent
Guinart

(10) Patent No.: US 8,791,808 B2
(45) Date of Patent: Jul. 29, 2014

(54) WIRELESS COMMUNICATION METHOD BETWEEN A CONTROL UNIT AND AN ELECTRONIC HOUSING MOUNTED ON A VEHICLE MEMBER

(75) Inventor: Nicolas Guinart, Toulouse (FR)

(73) Assignee: Continental Automotive France, Toulouse (FR)

( * ) Notice: Subject to any disclaimer, the term of this patent is extended or adjusted under 35 U.S.C. 154(b) by 239 days.

(21) Appl. No.: 13/509,038

(22) PCT Filed: Oct. 7, 2010

(86) PCT No.: PCT/EP2010/006128

§ 371 (c)(1),
(2), (4) Date: Jun. 7, 2012

(87) PCT Pub. No.: WO2011/060849

PCT Pub. Date: May 26, 2011

(65) Prior Publication Data

US 2012/0242475 A1 Sep. 27, 2012

(30) Foreign Application Priority Data

Nov. 20, 2009 (FR) ...................................... 0905583

(51) Int. Cl.
*B60C 23/00* (2006.01)

(52) U.S. Cl.
USPC ........... 340/447; 340/438; 340/442; 340/449; 701/29.1

(58) Field of Classification Search
CPC .. B60C 23/0408; B60C 23/033; G07C 5/008; G07C 5/0808
USPC .................. 340/447, 438, 442, 449; 701/29.1
See application file for complete search history.

(56) References Cited

U.S. PATENT DOCUMENTS 7,953,185 B2 5/2011 Sugiura
2004/0027241 A1 2/2004 Forster
2005/0162259 A1 * 7/2005 Hotta et al. .............. 340/426.13

FOREIGN PATENT DOCUMENTS

CN 101094208 A 6/2007

OTHER PUBLICATIONS

International Search Report, dated Nov. 15, 2010, from corresponding PCT application.

* cited by examiner

*Primary Examiner* — Steven Lim
*Assistant Examiner* — Hongmin Fan
(74) *Attorney, Agent, or Firm* — Young & Thompson

(57) ABSTRACT

In a method for wireless communication between a control unit and an electronic housing mounted on a vehicle member, information for the electronic housing is transmitted in the form either of continuous signals, or of signals modulated by encoded data. Each electronic housing includes a switching strategy between reception modes for the two types of signals, including establishing a permanent standby state for continuous signal reception and, upon the reception of a continuous signal, controlling a switchover to the modulated-signal reception mode for a time T, after which the electronic housing processes the data of the potential detected modulated signal and, if no such modulated signal is detected, processes the continuous signal at the origin of the switchover. Furthermore, after the time T, a reverse switchover control to the permanent standby state is delivered.

8 Claims, 1 Drawing Sheet

Figure 1:
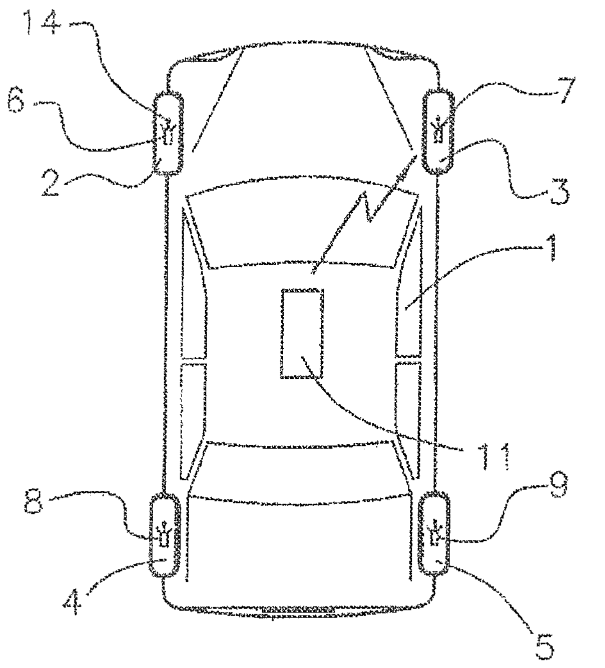

WIRELESS COMMUNICATION METHOD BETWEEN A CONTROL UNIT AND AN ELECTRONIC HOUSING MOUNTED ON A VEHICLE MEMBER

The invention relates to a method for wireless communication between a control unit, such as a central unit integrated into a vehicle or an external diagnostic tool manipulated by an interlocutor, and an electronic housing mounted on a vehicle member.

An increasing number of motor vehicles possess electronic systems such as systems for monitoring operating parameters of members of the vehicle or access systems for the locking and unlocking of the openings of said vehicle.

These electronic systems conventionally comprise electronic housings, an onboard central unit in the vehicle, and transmission means associated with the central unit and integrated into each electronic housing and adapted to make it possible to set up a dialogue between said central unit and said electronic housing for the purpose of using a given application.

As an example of monitoring systems, it is therefore possible to cite the systems for monitoring operating parameters of the wheels of a vehicle, comprising, mounted on each of said wheels, an electronic housing incorporating sensors dedicated to the measurement of parameters, such as pressure or temperature of the tires fitted to these wheels, and designed to make it possible to inform the driver of any abnormal variation in the measured parameter.

With respect to the data transmissions between the central unit and an electronic housing and notably the communication of data from the central unit to this electronic housing, a usual communication method consists:

- in transmitting information to the electronic housing in the form either of continuous signals consisting of a carrier wave, or of signals modulated by data forming an encoded message,
- and in configuring the electronic housing so that it possesses, on the one hand, two reception modes dedicated respectively, one to the detection of continuous signals consisting of a specific carrier wave, and the other to the detection of signals modulated by data, and, on the other hand, a strategy of switching between said reception modes.

One of the drawbacks of such a communication method lies in the fact that each switchover causes a "wake-up" of a reception stage which results in a peak of consumption and which consequently affects the service life of the battery integrated into the electronic housing.

The object of the present invention is to minimize this drawback and its main objective is to provide a communication method making it possible to obtain an optimized compromise between reactivity to the two stimulation modes, continuous signals and modulated signals, and service life of the batteries powering the electronic housings.

Accordingly, the invention relates to a method for communicating information to an electronic housing in the form either of continuous signals consisting of a carrier wave, or of signals modulated by data forming an encoded message, of which the strategy for switching over between the two reception modes consists:

- in establishing a permanent standby state in which the electronic housing is set to its continuous signals reception mode, and, during the reception of a continuous signal:

- in controlling a switchover to the modulated signals reception mode for a predetermined maximum time period T during which the electronic housing is programmed to process the data of the potential detected modulated signal, and at the end of which and in the absence of detection of a modulated signal during this period T, the electronic housing is programmed to process the reception of the continuous signal at the origin of the switchover, and after processing of the modulated signal or of the continuous signal,

- in switching over to the permanent standby state, in which the electronic housing is set to its continuous signals reception mode.

The invention has therefore consisted:

- in setting up a permanent standby in continuous signals reception mode, during the time windows determined by the application during which the two communication modes are used,
- in making the switchover to the modulated signals reception mode dependent only on the prior reception of a continuous signal,
- and in processing the detected signal, continuous or modulated, before reverting to the permanent standby state. It should be noted that the switchover back to the permanent standby state may, depending on the application, be followed by an effective immediate switching or be deferred depending on the conditions defined by the application (time delay, etc.).

Consequently, the mode changes occur only occasionally in predetermined conditions which make it possible to optimally minimize the frequency of these changes without affecting the reactivity of the transmission method, because the switchover strategy is conditional upon the reception of a continuous signal.

The direct consequence of such a switchover strategy lies in an optimal reduction in electrical consumption which may optionally lead to a reduction in the size of the batteries, or to an increase in the service life of these batteries, or to an increase in the performance of the components integrated into the electronic housings (implementation of additional functions, etc.).

According to one advantageous embodiment, each electronic housing is furnished with a filter having characteristics determining a minimum reception time Tf before confirmation of the reception of a continuous signal.

Such a filter makes it possible to prevent premature switchovers and processings resulting for example from the reception of "noise". This filter can usually be either of the digital type (counting the number of sine waves of the signal), or of the analogue type (measuring the filling time of a capacity). Moreover, in practice, this filter is normally adapted to have a threshold of between 0.8 and 10 milliseconds.

According to another advantageous embodiment of the invention, for the communication of continuous signals to an electronic housing, a protocol is defined consisting:

- for the electronic housing, in establishing a time period listening cycle Tr, defining, for each time period Tr, an effective reception time Tr (on) and a non reception time Tr(off),
- and, for the control unit, in controlling the transmission of continuous signals consisting of a carrier wave, for durations of transmission at least equal to the non reception time Tr(off) added to the minimum reception time Tf determined by the filter.

Such an embodiment makes it possible, by virtue of a cut-off, to reduce the consumption of the electronic housings while ensuring the effective detection of the continuous signals transmitted by the control unit.

It should be noted that, in absolute terms, the transmission time required for ensuring an effective reception is equal to the nonreception time Tr(off) of the electronic housing during each reception period Tr, added to the temporal characteristic Tf of the filter. However, this filtering duration Tf is systematically less than the effective reception time Tr(on) of the electronic housing during each reception period Tr, so that the transmission durations are advantageously chosen to be equal to Tr so as to benefit from a safety margin ensuring the detection of the continuous signal.

According to another advantageous embodiment, for the control unit, a transmission cycle of time period Te is established, defined so that, for each time period Te, the effective transmission time Te(on) is greater than the minimum reception time Tf determined by the filter of the electronic housings, and the nontransmission time Te(off) is smaller than or equal to Tr (on)−Tf, where Tr(on) is the effective reception time of the electronic housings.

Such an embodiment makes it possible, by virtue of a cut-off, to reduce the consumption of the control unit, while ensuring the effective reception by the electronic housings of the continuous signals transmitted by said control unit.

According to another advantageous embodiment of the invention, for the communication of modulated signals to an electronic housing, a protocol is defined consisting:

- for the control unit, in controlling, in the first place, the transmission of a continuous signal of a duration greater than the non reception time Tr(off) of the electronic housing added to the minimum reception time Tf determined by the filter of said electronic housing, then in the second place, after a predetermined elapsed time Tb adapted to ensure an effective switchover of the electronic housing to the modulated signals reception mode, the transmission of n identical data streams where n≥1,
- and, for the electronic housing, after confirmation of a continuous signal reception, in keeping said electronic housing in its modulated signals reception mode for a period T at least equal to the transmission time of the n identical data streams.

Such a protocol therefore consists, in the first place, in transmitting any modulated signal of a continuous signal of a duration ensuring its reception by the electronic housing, followed by an elapsed time Tb to ensure an effective switchover of said electronic housing to the modulated signals reception mode.

The modulated signal then comprises n data streams, the number n of streams being, in the first place, a function of the capacities of the control unit and constituting a compromise between the required reception time and the guaranteed reception rate.

Figure 2:
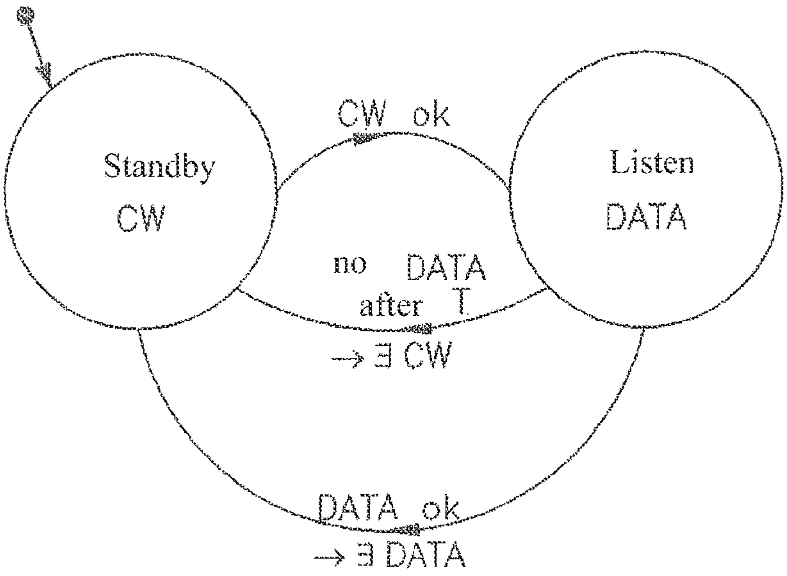

Other features, objects and advantages of the invention will emerge from the following detailed description given with reference to the appended drawings which represent thereof, as a non limiting example, a preferred embodiment. In these drawings:

FIG. 1 is a schematic view from above of a vehicle furnished with a system for monitoring parameters of operation of the wheels of said vehicle, and FIG. 2 is a diagram representing the algorithm of operation of the communication method that is the subject of the invention.

The communication method according to the invention may be applied notably for the purpose of transmitting information of a monitoring system, such as that shown in FIG. 1, that is suitable to be fitted to a vehicle 1 furnished with four wheels conventionally shod with a tire: two front wheels 2, 3 and two rear wheels 4, 5.

Such monitoring systems conventionally comprise, in the first place, associated with each wheel 2-5, an electronic housing 6-9, for example secured to the rim of said wheel so as to be positioned inside the casing of the tire.

Each of these electronic housings 6-9 incorporates for example sensors dedicated to the measurement of parameters, such as pressure and/or temperature of the tire, connected to a microprocessor linked to a transceiver connected to an antenna (not shown).

The monitoring system also comprises a centralized computer or central unit 11 comprising a microprocessor and incorporating a transceiver connected to an antenna (not shown), said transceiver being capable of transmitting signals to four electronic housings 6-9, and of receiving signals from said electronic housings.

It should be noted that the number of antennas controlled by the central unit 11 may be greater and for example consist of an antenna placed close to each wheel.

Usually, such a monitoring system (notably its central unit 11) is designed so as to inform the driver of any abnormal variation in the parameters measured by the sensors associated with the wheels 2-5.

The communication method according to the invention relates to the transmission, by the central unit 11, of information to the electronic housings 6-9 in the form of either continuous signals consisting of a carrier wave, or of signals modulated by data forming an encoded message.

According to this method, each electronic housing 6-9 possesses, on the one hand, two reception modes dedicated respectively, one to the detection of continuous signals consisting of a specific carrier wave, and the other to the detection of signals modulated by data, and, on the other hand, a strategy for switching over between said reception modes.

Moreover, specifically according to the invention and as illustrated in FIG. 2, the strategy for switching over between the two reception modes consists:

- in establishing, by default, a permanent standby state "Standby CW" in which the electronic housing 6-9 is set to its continuous signals reception mode, and, during the reception of a continuous signal "CW ok":
- in controlling a switchover of the electronic housing 6-9 to its modulated signals reception mode "Listen DATA" for a predetermined time period T during which the electronic housing 6-9 is programmed to process the data of the potential detected modulated signal, "DATA ok", and at the end of which, in the absence of detection of such a modulated signal, "no DATA", the electronic housing 6-9 is programmed to process the continuous signal at the origin of the switchover, and, after processing of the modulated signal or of the continuous signal,

- in switching over to the permanent standby state "Standby CW", in which the electronic housing 6-9 is set to its continuous signals reception mode.

Moreover, each electronic housing 6-9 comprises a digital or analogue filter for determining the minimum duration Tf of the continuous signals which is necessary for said signals to be processed by said electronic housings.

The power supply of the receiver of each electronic housing 6-9 is moreover suitable for dividing up the reception time into reception periods Tr, during each of which a cut-off is carried out that is adapted so that the duty cycle representative of the ratio of the effective reception time Tr(on) over the period Tr has a predetermined value. As an example, each period Tr may therefore be of the order of 100 milliseconds and the duty cycle equal to 10%, that is to say that the effective reception time Tr(on) is equal to 10 milliseconds and the nonreception time Tr(off) is 90 milliseconds.

Similarly, the power supply of the transmitter of the central unit 11 is adapted in order to divide up the transmission time into time periods Te for each of which the effective transmission time Te(on) is greater than the minimum reception time Tf determined by the filter of the electronic housings, and the non transmission time Te(off) is less than or equal to Tr(on)−Tf, where Tr(on) is the effective reception time Tr(on) of the electronic housings. If reference is made to the digital example above, each period Te may therefore be equal to 29 milliseconds divided by a transmission time Te(on) of 20 milliseconds and a nontransmission time Te(off) of 9 milliseconds.

These data (filter and transmission and reception cycles) therefore make it possible to establish, for the communication of continuous signals, a protocol consisting:

for the electronic housing 6-9, in dividing up, as aforementioned, the reception time into reception periods Tr, and, for the central unit 11, in controlling the transmission of continuous signals consisting of a carrier wave, for transmission durations at least equal to Tf+Tr(off), in practice chosen to be at least equal to the reception period Tr.

With respect to the communication of modulated signals to the electronic housings 6-9, the protocol consists:

for the control unit 11, in controlling, in the first place, the transmission of a continuous signal of a duration greater than the nonreception time Tr (off) of the electronic housing 6-9 added to the minimum reception time Tf determined by the filter of said electronic housing, then, in the second place, after a predetermined elapsed time Tb adapted to ensure an effective switchover of the electronic housing 6-9 to the modulated signals reception mode, the transmission of n identical data streams, where n≥1, and, for the electronic housing 6-9, in keeping the latter, after confirmation of a continuous signal reception, in its modulated signals reception mode for a period T, for example equal to 100 milliseconds, at least equal to the transmission time of n identical data streams.

Such a communication method incorporating these communication protocols makes it possible to obtain an optimized compromise between reactivity to the two stimulation modes, continuous signals and modulated signals, and service life of the batteries supplying the electronic housings.

The invention claimed is:

1. A method for wireless communication between a control unit (11), such as a central unit integrated into a vehicle or an external diagnostic tool manipulated by an interlocutor, and an electronic housing mounted on a vehicle member, said method consisting:

in transmitting information to the electronic housing (6-9) in the form either of continuous signals consisting of a carrier wave, or of signals modulated by data forming an encoded message, and in configuring the electronic housing (6-9) so that it possesses, on the one hand, two reception modes dedicated respectively, one to the detection of continuous signals consisting of a specific carrier wave, and the other to the detection of signals modulated by data, and, on the other hand, a strategy of switching between said reception modes, said communication method being characterized in that the strategy for switching over between the two reception modes consists:

in establishing a permanent standby state in which the electronic housing (6-9) is set to its continuous signals reception mode, and, during the reception of a continuous signal:

in controlling a switchover to the modulated signals reception mode for a predetermined maximum time period T during which the electronic housing (6-9) is programmed to process the data of the potential detected modulated signal, and at the end of which and in the absence of detection of a modulated signal during this period T, the electronic housing (6-9) is programmed to process the reception of the continuous signal at the origin of the switchover, and after processing of the modulated signal or of the continuous signal, in switching over to the permanent standby state, in which the electronic housing (6-9) is set to its continuous signals reception mode.

2. The communication method as claimed in claim 1, characterized in that each electronic housing (6-9) is furnished with a filter having characteristics determining a minimum reception time Tf before confirmation of the reception of a continuous signal.

3. The communication method as claimed in claim 1, characterized in that, for the communication of continuous signals to an electronic housing (6-9), a protocol is defined consisting:

for the electronic housing (6-9), in establishing a time period listening cycle Tr, defining, for each time period Tr, an effective reception time Tr(on) and a nonreception time Tr(off), and, for the control unit (11), in controlling the transmission of continuous signals consisting of a carrier wave, for durations of transmission at least equal to the nonreception time Tr(off) added to the minimum reception time Tf determined by the filter.

4. The communication method as claimed in claim 3, characterized in that, for the control unit (11), a transmission cycle of time period Te is established, defined so that, for each time period Te, the effective transmission time Te(on) is greater than the minimum reception time Tf determined by the filter of the electronic housings (6-9), and the nontransmission time Te(off) is smaller than or equal to Tr(on)−Tf, where Tr(on) is the effective reception time of the electronic housings (6-9).

5. The communication method as claimed in claim 2, characterized in that, for the communication of modulated signals to an electronic housing (6-9), a protocol is defined consisting:

for the control unit (11), in controlling, in the first place, the transmission of a continuous signal of a duration greater than the nonreception time Tr(off) of the electronic housing (6-9) added to the minimum reception time Tf determined by the filter of said electronic housing, then in the second place, after a predetermined elapsed time Tb adapted to ensure an effective switchover of the electronic housing (6-9) to the modulated signals reception mode, the transmission of n identical data streams where n≥1, and, for the electronic housing (6-9), after confirmation of a continuous signal reception, in keeping said electronic housing in its modulated signals reception mode for a period T at least equal to the transmission time of the n identical data streams.

6. The communication method as claimed in claim 2, characterized in that, for the communication of continuous signals to an electronic housing (6-9), a protocol is defined consisting:

for the electronic housing (6-9), in establishing a time period listening cycle Tr, defining, for each time period Tr, an effective reception time Tr(on) and a nonreception time Tr(off), and, for the control unit (11), in controlling the transmission of continuous signals consisting of a carrier wave, for durations of transmission at least equal to the nonreception time Tr(off) added to the minimum reception time Tf determined by the filter.

7. The communication method as claimed in claim 3, characterized in that, for the communication of modulated signals to an electronic housing (6-9), a protocol is defined consisting:

for the control unit (11), in controlling, in the first place, the transmission of a continuous signal of a duration greater than the nonreception time Tr(off) of the electronic housing (6-9) added to the minimum reception time Tf determined by the filter of said electronic housing, then in the second place, after a predetermined elapsed time Tb adapted to ensure an effective switchover of the electronic housing (6-9) to the modulated signals reception mode, the transmission of n identical data streams where n≥1, and, for the electronic housing (6-9), after confirmation of a continuous signal reception, in keeping said electronic housing in its modulated signals reception mode for a period T at least equal to the transmission time of the n identical data streams.

8. The communication method as claimed in claim 4, characterized in that, for the communication of modulated signals to an electronic housing (6-9), a protocol is defined consisting:

for the control unit (11), in controlling, in the first place, the transmission of a continuous signal of a duration greater than the nonreception time Tr(off) of the electronic housing (6-9) added to the minimum reception time Tf determined by the filter of said electronic housing, then in the second place, after a predetermined elapsed time Tb adapted to ensure an effective switchover of the electronic housing (6-9) to the modulated signals reception mode, the transmission of n identical data streams where n≥1, and, for the electronic housing (6-9), after confirmation of a continuous signal reception, in keeping said electronic housing in its modulated signals reception mode for a period T at least equal to the transmission time of the n identical data streams.

* * * * *